United States Patent
Cai et al.

(10) Patent No.: US 6,356,630 B1
(45) Date of Patent: Mar. 12, 2002

(54) TELEPHONE CALLING CARD SERVICE SYSTEM INTEGRATING VIRTUAL DESTINATION NUMBERS

(75) Inventors: Yigang Cai, Naperville; Shiyan Hua, Wheaton, both of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/346,152

(22) Filed: Jul. 9, 1999

(51) Int. Cl.[7] .............................................. H04M 17/00
(52) U.S. Cl. .............................. 379/144.01; 379/114.15; 379/114.2; 379/211.02
(58) Field of Search ................. 379/111–114, 133–134, 379/144–145, 188–189, 191, 196, 197, 88.19, 88.2, 88.21, 93.23, 142, 114.15, 114.2, 114.29, 115.01, 120, 211.02, 216.01, 219

(56) References Cited

U.S. PATENT DOCUMENTS 5,812,533 A * 9/1998 Cox et al.
6,157,707 A * 12/2000 Baulier et al. .............. 379/189
6,160,882 A * 12/2000 Weik et al. ................. 379/220
6,163,606 A * 12/2000 Otto ............................ 379/211

* cited by examiner

*Primary Examiner*—Duc Nguyen
(74) *Attorney, Agent, or Firm*—Gregory P. Gadson

(57) ABSTRACT

A telephone calling card (prepaid or postpaid) service system with an intelligent network (IN) for automated call processing novelly associates a Virtual Destination Number (VDN) with each calling card account to significantly broaden service options to calling card account subscribers. As a result, a calling card customer can combine calling card service with voice mail service and call forwarding service, which was heretofore not possible. More particularly, the additional services include: the ability of a calling card customer to check a voice mailbox associated with the calling card VDN; the ability of a calling card customer to create and change voice mail greeting options; the ability of a calling card customer to establishing a call forwarding number; and the ability of third parties dialing the VDN to either be connected to a call forwarding number if established, or access the calling card account subscriber's voice mailbox.

12 Claims, 5 Drawing Sheets

mail and call forwarding with existing calling card call placement services.

TELEPHONE CALLING CARD SERVICE SYSTEM INTEGRATING VIRTUAL DESTINATION NUMBERS

BACKGROUND OF THE INVENTION

1. Field of the Invention

The present invention generally relates to networks for providing telephone services. More particularly, the present invention relates to the expansion of telephone services accessible with pre-paid and post-paid calling cards.

2. Background of Related Art

Telephone calling cards store information used in connection with the delivery of, and billing for telephone services. "Pre-paid" calling cards are associated with an account having a fixed amount of charges allowable. "Post-paid" calling cards are associated with accounts where the charges are paid in arrears for each billing cycle.

In a typical calling card transaction, a user desiring to place a call takes a telephone off-hook and dials an access number, perhaps followed by the number printed on the calling card (corresponding to an account), a personal identification number (PIN) for security purposes, and then the destination telephone number. Alternatively, information such as the calling card number can be read by a card reader or magnetic stripe reader if such a device is attached to the user's telephone terminal.

A central database stores all of the calling card numbers supported by the system, along with a corresponding PIN for each. The PIN input by the user is compared to the correct PIN stored in memory. If the input PIN matches the stored PIN, a switch in the system completes the connection and establishes the desired call. If the PIN transmitted by the user does not match the stored PIN, the call is refused, whereupon the user is either given further opportunities to enter the correct PIN, or the call is terminated, or other action is taken, depending on the "call flow." The call flow of a telephone system is a comprehensive algorithm controlling logic used to establish and maintain a call.

Many calling card service systems use an intelligent network (IN) for automated processing of calling card transactions. In such a system, the customer dials a service access code (SAC) to connect to the IN for processing of a call. The IN receives information such as the calling line identification (CLI) from the origination telephone line, and the calling card number, PIN, and destination number from the customer.

A service control point (SCP) in the IN compares information received from the customer with information stored in its database (calling card number, PIN, etc.). The SCP decides whether a call is authorized, and if so directs a Service Switching Point (SSP) of the IN to connect the call to the destination number. The SCP and SSP of such a system may be connected with a high-speed link utilizing, for example, the Intelligent Network Application Protocol (INAP), as approved by the European Telecommunications Standards Institute (ETSI) and International Telecommunication Unit (ITU).

In the prior art, calling card account subscribers desiring to both place telephone calls via the calling card number, and use other services such as voice mail and call forwarding must use these services completely separate of one another. That is, the calling card number cannot be used for those purposes. This results in a lack of convenience for customers.

Therefore, what is lacking but needed in the prior art is a system and method for combining services such as voice mail and call forwarding with existing calling card call placement services.

SUMMARY OF THE INVENTION

In view of the above-identified problems and limitations of the prior art, the present invention provides a telephone calling card service system in which calling card account subscribers are assigned Virtual Destination Numbers (VDNs), allowing the use of voice mail, call forwarding and other services heretofore unavailable to calling card customers. VDNs are telephone numbers which when assigned, identify and telephone customer without specifying a physical calling line, and are somewhat analogous to mobile telephone numbers (although the former have no specific equipment associated therewith).

More particularly, the present invention provides a telephone calling card service system for processing telephone calls to be charged to calling card accounts, the system at least including:

a plurality of input telephonic devices operatively coupled to an origination telephone line, the input telephonic device at least including an alphanumeric information generator adapted to at least transmit a calling card account card number, security information, and a destination telephone number;

an automated intelligent network (IN) coupled to origination telephone lines adapted to process calling card account telephone calls, the IN at least including a service control point (SCP), and the SCP at least including an SCP control unit and an SCP database coupled to the SCP control unit, the IN being adapted to authorize the routing of calling card account telephone calls; and at least one switch operatively coupled to the origination telephone line and to the SCP, the switch adapted to route calls authorized by the SCP to a destination number specified by the customer;

the SCP database at least storing system account numbers, corresponding security information and an assigned Virtual Destination Number (VDN), and the SCP control unit, upon receipt of customer information collected via the origination telephone line, compares information and determines whether a telephone call is authorized; and the SCP being adapted to provide additional services to the customer and third parties based upon the VDN.

The present invention also provides, in a telephone calling card service system, a telephone calling card service method for processing telephone calls to be charged to calling card accounts, the method at least including the steps of:

via input telephonic devices coupled to origination telephone lines, at least transmitting a calling card account card number, security information, and a destination telephone number;

via an automated intelligent network (IN) coupled to origination telephone lines, processing calling card account telephone calls, the IN at least including a service control point (SCP), and the SCP at least including an SCP control unit and an SCP database coupled to the SCP control unit, authorizing the routing of calling card account telephone calls; and via at least one switch operatively coupled to the origination telephone line and to the SCP, routing calls authorized by the SCP to a destination number specified by the customer;

the SCP database at least storing system account numbers, corresponding security information and an assigned Virtual Destination Number (VDN), and the SCP control unit, upon receipt of customer information collected via the origination telephone line, comparing information and determining whether a telephone call is authorized; and providing additional services to the customer and third parties based upon the VDN.

BRIEF DESCRIPTION OF THE DRAWING FIGURES

Features and advantages of the present invention will become apparent to those skilled in the art from the description below, with reference to the following drawing figures, in which.

Figure 4:
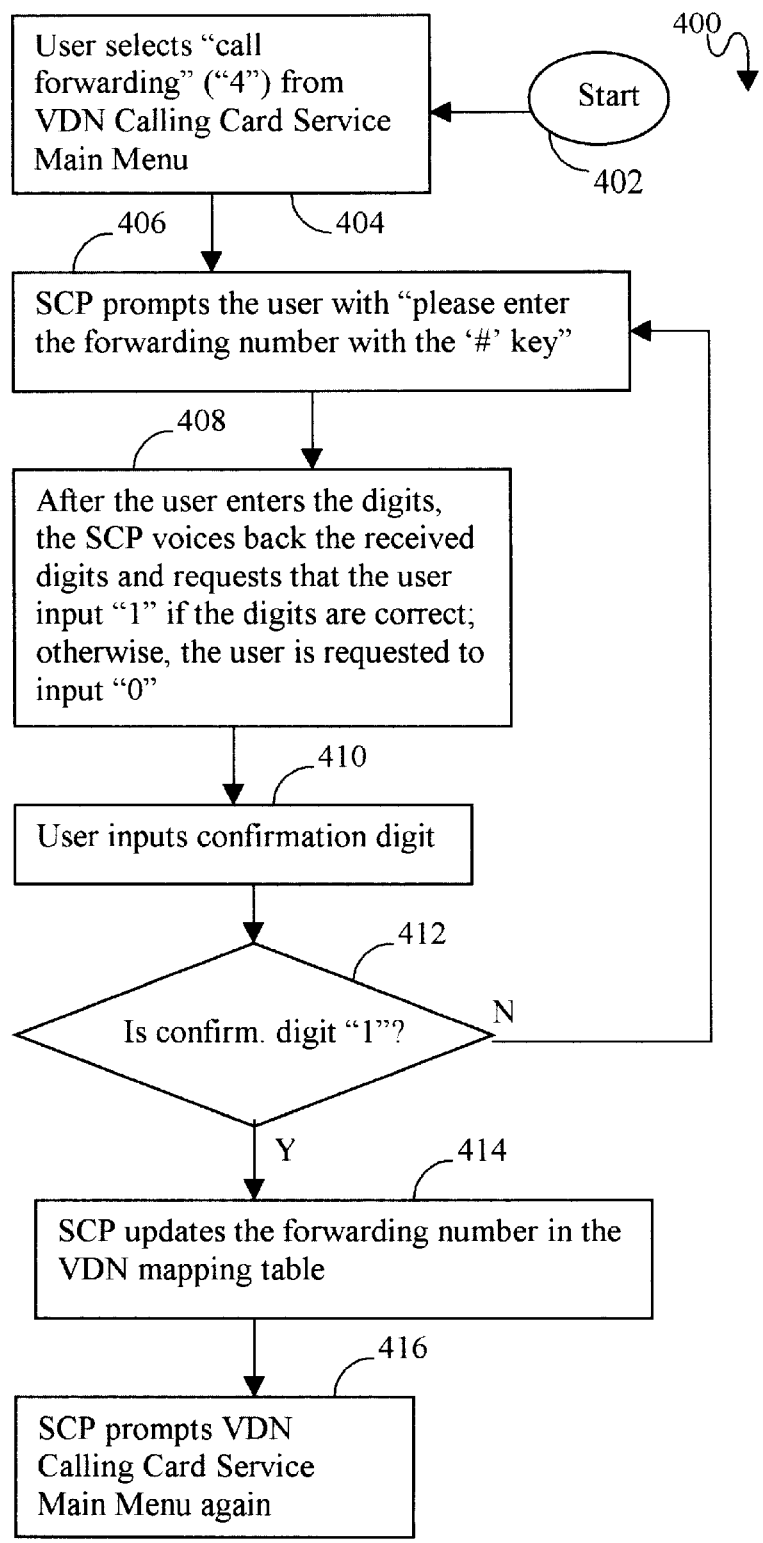
Figure 5:
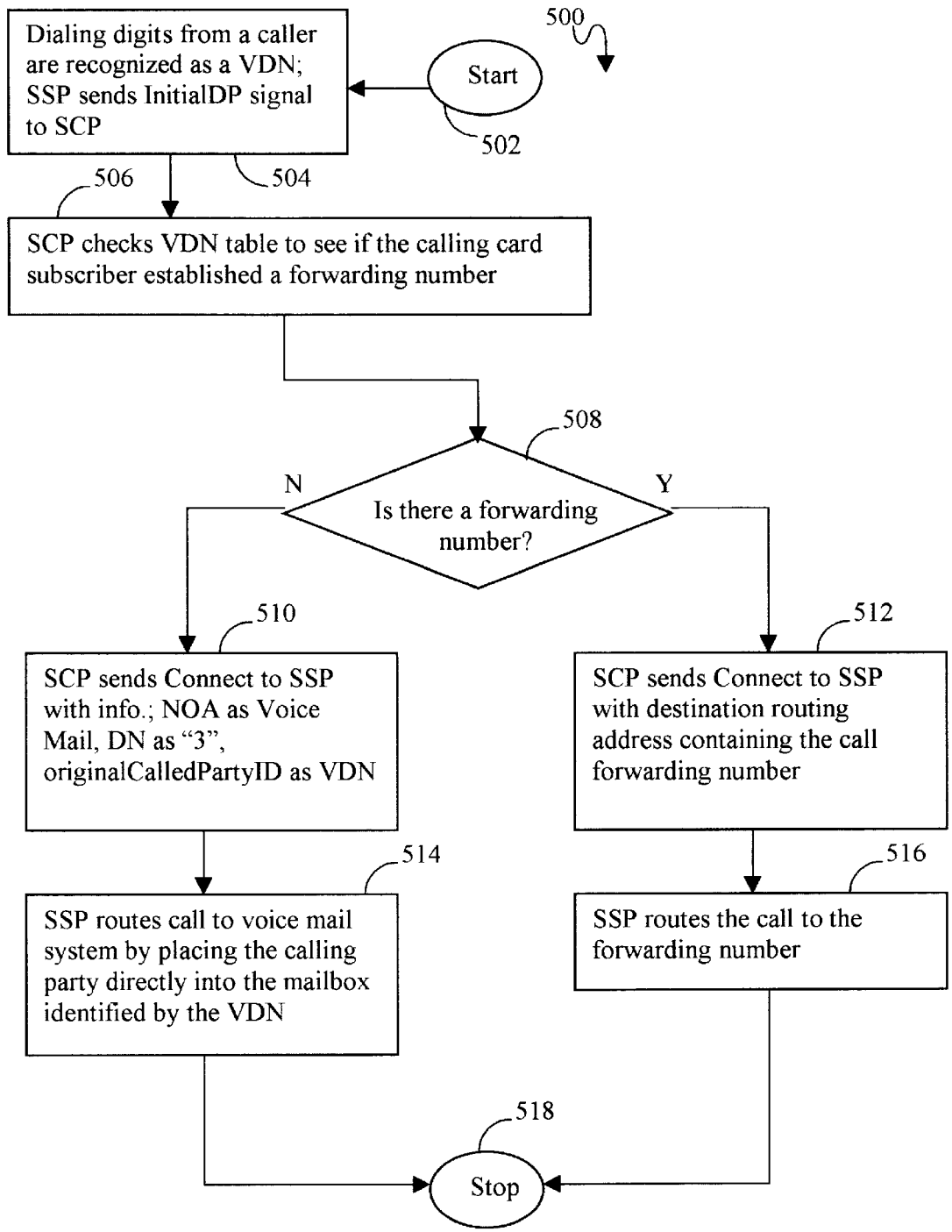

FIG. 4 is a flowchart/algorithm detailing the call flow of the aspect of the present invention allowing a customer to establish a call forwarding number; and FIG. 5 is a flowchart/algorithm detailing the call flow of the aspect of the present invention allowing a third party to, by dialing a VDN, either connect to a calling card customer's call forwarding number if established, or connect to the calling card customer's voice mailbox, if there is no call forwarding number established for the VDN.

DESCRIPTION OF THE PREFERRED EMBODIMENTS

1. General Description

Figure 1:
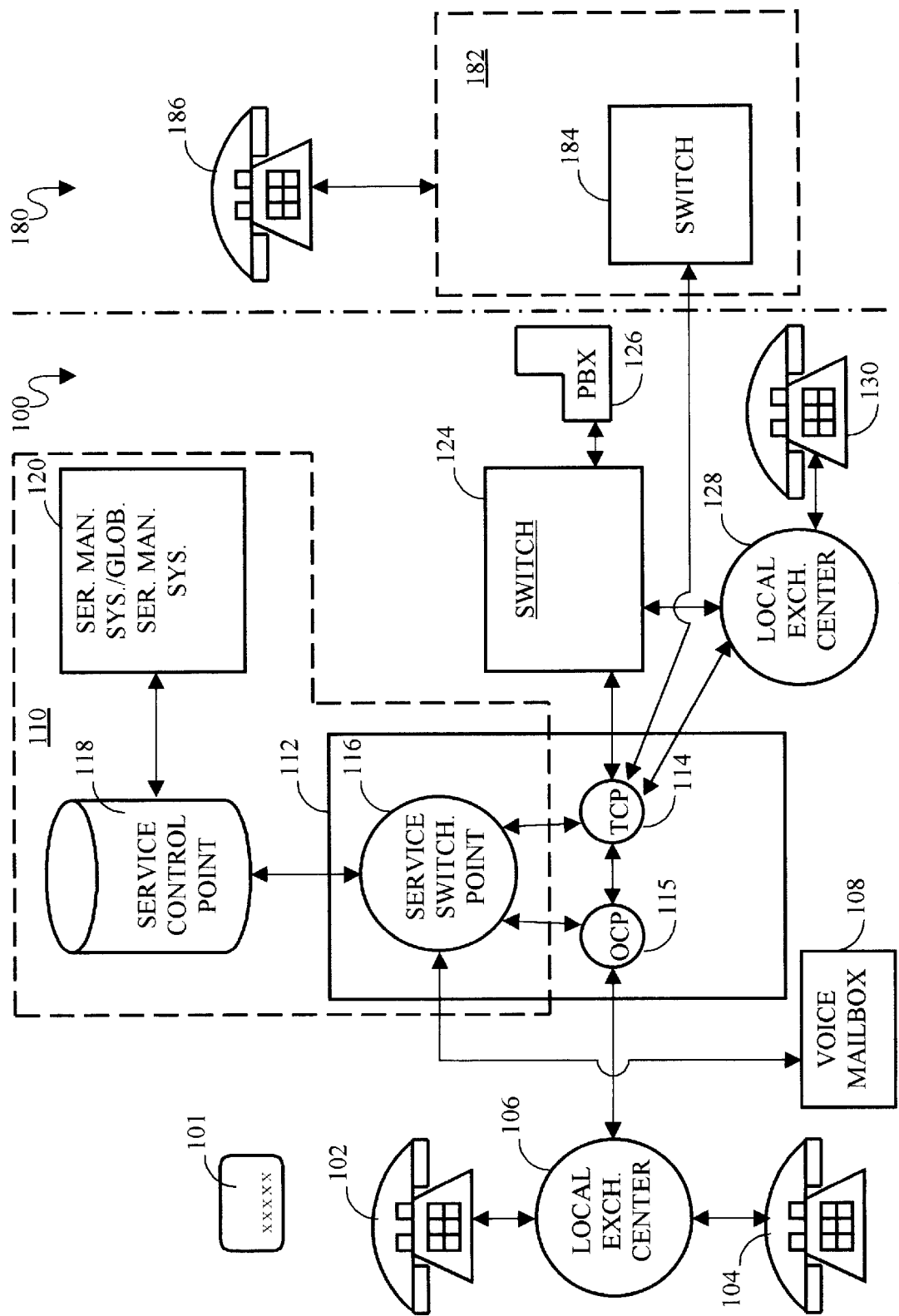
FIG. 1 is a schematic block diagram of the basic hardware for the present-inventive telephone calling card service system, which system assigns a virtual destination number to each calling card account subscriber.

The basic hardware of the telephone calling card service system 100/180 is illustrated in FIG. 1.

The system 100/180 combines a domestic network 100, as in the United States, for example, and a foreign network 180, as in Europe, for example. The system 100/180 includes a variety of telephonic input devices as would be common in a general telephone system. For example, a user can connect to the network 100 using such devices as common telephones 102 and 104. As an example, a user can attempt to complete a calling card transaction using a telephone which is part of a private branch exchange (PBX) as is known in the art. The telephones include alphanumeric keypads for inputting Dual-Tone-Multi-Frequency (DTMF) signals, or the like, as is common.

A telephone calling card 101 (or a card number plus PIN) at least stores a card number corresponding to a calling card account, and is used to facilitate a call placement through the system 100/180.

Local exchange centers (LECs) such as the one 106 handle all initial calls, and route calls to a switch 112 when a service access code (SAC) is received, either from the user or from a card reader (not shown) integrated into the telephone terminals. The access number indicates to the LEC that the user desires to make a calling card transaction.

An Originating Call Processor (OCP) 115 within the switch 112 transfers the call to a service switching point (SSP) 116. The SSP is part of an intelligent network (IN) 110, capable of automated processing of calling card transactions. A Terminating Call Processor (TCP) 114 handles the termination of call processing once a call has been connected to the destination number.

The SSP 116 is linked to a service control point (SCP) 118. The SCP 118 has an extensive database storing calling card numbers supported by the system and their associated account numbers, current account status information, and any other information used to facilitate transactions. The SCP 118 performs service logic and provides the SSP 116 with call handling instructions, as provisioned by the system and the calling card subscriber. The SSP 116 also updates the information stored in the SCP 118 (such as new charges to the account) as is appropriate. It will be appreciated by those skilled in the art that the SCP 118 can be implemented as a networked database, not limited to one geographic location.

Once a calling card user is connected to the SSP 116, the SSP queries the SCP 118 for account security information pertaining to the calling card upon which the transaction is based. The SSP 116 also contains a master clock (not shown) for keeping track of current times and dates. In some embodiments, the master clock calibrates other clocks used to measure such quantities as the elapsed time of calls.

Once the SCP 118 receives a query from the SSP 116, the user is prompted to remit information such as the calling card number, PIN, and the destination number (DN) to send to the SCP. If the PIN matches the stored PIN, the transaction continues. If not, the user can be given extra tries to enter the correct PIN.

In the preferred embodiment, a service management system (SMS) or global service management system (GSMS) 120 is employed to provision the calling card account information stored in the system, and to send the needed information to the database of the SCP 118.

A calling card account subscriber can set up an account and establish security and other information related thereto via a customer service center or SMS/GSMS 120. After initial account set-up, modifications (of the PIN, for example) are also made via the SMS/GMS 120. The calling card account subscriber can connect to the SMS/GMS 120 through various means, including direct telephone connection, or by using a computer and Transmission Control Protocol/Internet Protocol (TCP/IP), a networking protocol.

A switch 124 that may include an SSP will route an approved telephone call to its final destination as mentioned above.

The interface between the SSP 116 and the SCP 118 uses the ETSI/INAP or ITU/INAP protocol for speed and compatibility. The interface between the SSP 116 and the OCP 115, and the interface between the SSP and TCP use a switch internal message flow, or a common channel signaling link or any type of protocols, as will be appreciated by those skilled in the art.

The voice mailbox 108 can be either a stand-alone unit linked to the switch (as shown in FIG. 1), or a unit integrated into the switch (not shown). The voice mailbox has sufficient sub-addresses for voice mail subscriber accounts. The voice mailbox utilizes the User ID and password for secure access. The voice mail has at least one pre-recorded greeting which can be created and updated by the subscriber on-line.

The system and method of the present invention require that calling card numbers be assigned Virtual Destination Numbers (VDNs). Recall from the "Summary" section, that a VDN is a telephone number for identifying a telephone customer without associating a physical calling line or equipment. In the preferred embodiment, the prefixes of the VDNs distinguish them from other possible telephone numbers (i.e., the particular prefixes involved are reserved only for inclusion in VDNs). The SCP database contains a VDN mapping table (not shown) that stores for each calling card subscriber account, the calling card number, an assigned VDN, and a call forwarding number if applicable (see infra).

2. Calling Card Customer Telephone Calls

A calling card customer can make a telephone call first by dialing a SAC. Upon connection to the system 100/180 the customer enters the calling card number with the PIN. After verification by the SCP, the OCP prompts the customer with the following audible (although a screen can also visually duplicate the information in an alternate embodiment) VDN Calling Card Service Main Menu: "To make a phone call, press '1;' To check voice mailbox, press '2;' To create or update the greeting for voice mailbox, press '3;' To input call forwarding number, press '4;' and To exit, press '5.'" Those skilled in the art will appreciate that the menu can be different from the example given above.

When the customer enters "1" the system processes the telephone call normally, requesting entry of the destination number. The VDN is used as the original calling party number.

3. Checking the VDN Associated Voice Mailbox

Figure 2:
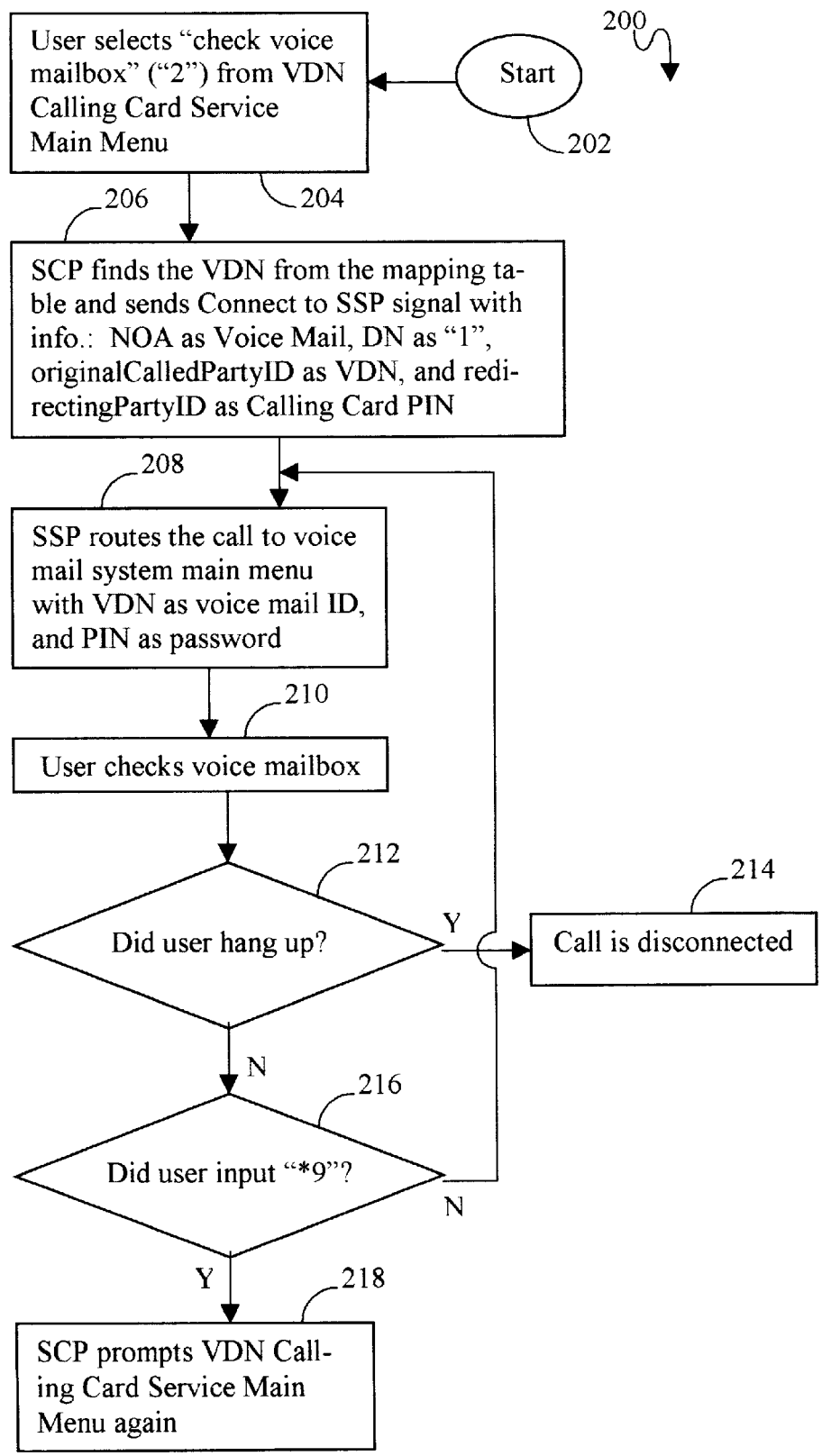
FIG. 2 is a flowchart/algorithm detailing the call flow of the aspect of the present invention allowing a customer to check a voice mailbox.

When a calling card customer wishes to access his/her voice mailbox in a voice mailbox system 108 (see FIG. 1), the customer dials a SAC, and then the calling card number PIN to reach the VDN Calling Card Service Main Menu, as previously described. The algorithm 200 in FIG. 2 governs the rest of the transaction.

After the start (Step 202) of the algorithm, the user selects "2" from the menu corresponding to "check voice mailbox" (Step 204). In Step 206 the SCP finds the calling card customer's VDN from the VDN mapping table and sends a Connect Operation signal to the SSP. The Connect Operation signal includes a series of bytes called a Destination Routing Address (DRA) which contains the initial information needed for processing the call by the switch, including a Network Routing Address (NRA), a Nature of Address (NOA) portion, a destination number (DN) portion, an original called party ID ("originalCalledPartyID"), and a redirecting party ID (redirectingPartyID").

For this operation, the NOA portion of the DRA indicates voice mail, while the DN is set to "1" indicating access to the voice mail system (checking mail), the originalCalledPartyID portion contains the VDN, and the redirectingPartyID contains the calling card customer's PIN.

Next, the SSP routes the call to a voice mail system main menu and automatically transmits the customer's VDN as a voice mail ID, and the customer's PIN as the password (Step 208). The user can then check his/her mailbox for messages (Step 210). After checking the voice mailbox, the user can hang-up (Step 212), in which case the call is disconnected (Steps 214 and 220), or the user can input a code such as "*9" (Step 216) to reach the Calling Card Service Main Menu again for other transactions (Step 218).

If the user did not hang-up or enter "*9" in Step 216, he/she is returned to the voice mail system main menu for more voice mail operations including updating or changing greetings, described infra, for example.

4. Updating Greetings for the VDN Associated Voice Mailbox

Figure 3:
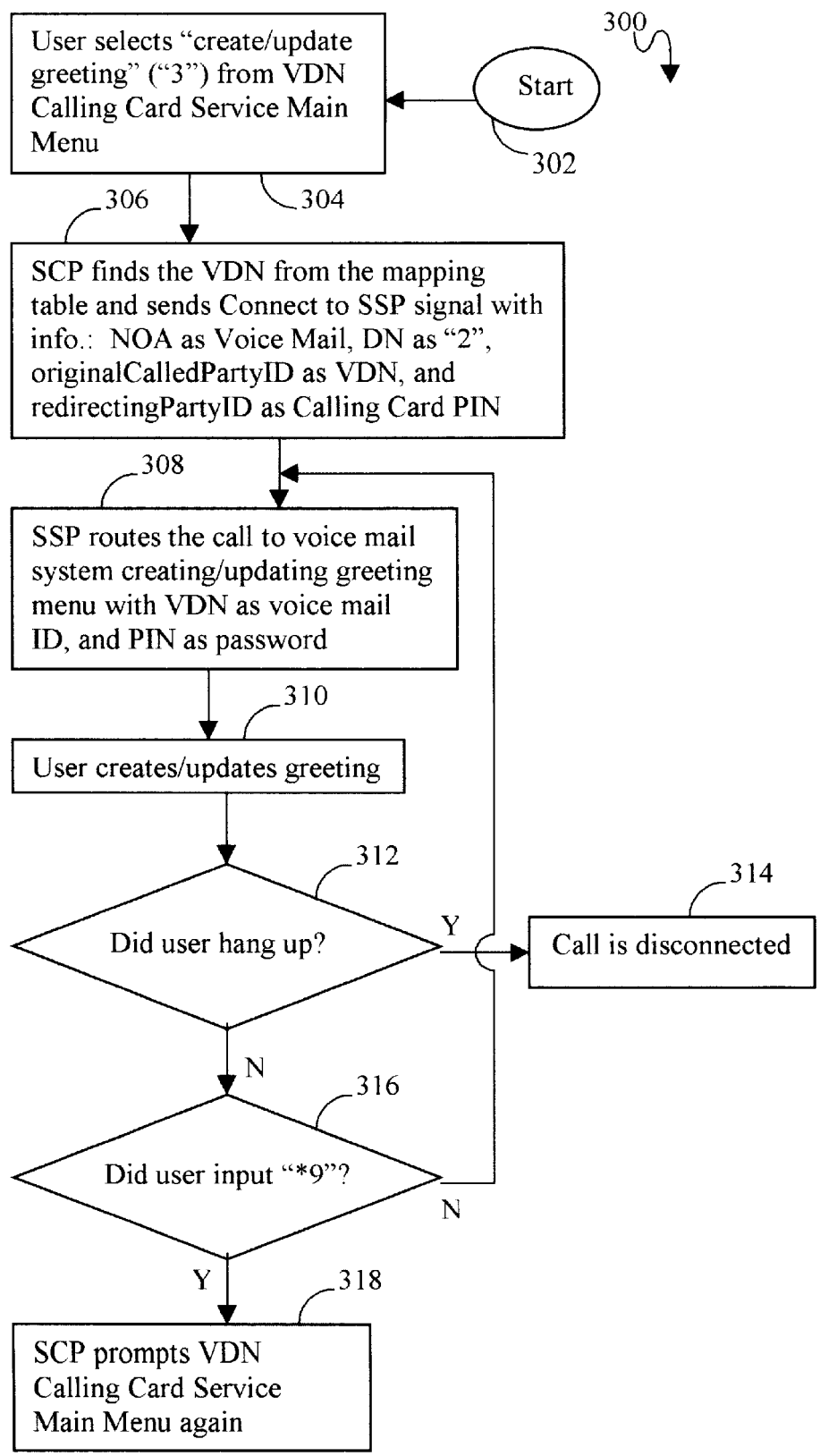
FIG. 3 is a flowchart/algorithm detailing the call flow of the aspect of the present invention allowing a customer to create or update a voice mail greeting.

A calling card customer can create or update voice mail greetings according to the algorithm 300 in FIG. 3. After the start (Step 302) of the algorithm, the user selects "3" from the VDN Calling Card Service Main Menu corresponding to "update/change voice mail greeting" (Step 304). In Step 306 the SCP finds the calling card customer's VDN from the mapping table and sends a Connect Operation signal to the SSP. For this operation, the NOA portion of the DRA indicates voice mail, while the DN is set to "2" indicating access to the voice mail system for creating or changing greetings, the originalCalledPartyID portion contains the VDN, and the redirecting PartyID portion contains the calling card customer's PIN.

Next, the SSP routes the call to a voice mail system menu for greeting changes, and automatically transmits the customer's VDN as a voice mail ID, and the customer's PIN as the password (Step 308). The user can then create or change his/her mailbox greeting (Step 310). After changing the greeting, the user can hang-up (Step 312), in which case the call is disconnected (Steps 314 and 320), or the user can input "*9" (Step 316) to reach the Calling Card Service Main Menu again for other transactions (Step 318).

If the user did not hang-up or enter "*9" in Step 316, he/she is returned to the voice mail greeting change menu (Step 308) for further greeting change operations, etc.

5. VDN Associated Call Forwarding

A calling card customer can establish a call forwarding number where calls to the VDN will be transferred according to the algorithm 400 in FIG. 4. After the start (Step 402) of the algorithm, the user selects "4" from the VDN Calling Card Service Main Menu corresponding to "call forwarding" (Step 404). In Step 406 the SCP (via the OCP) prompts the user to enter the desired call forwarding telephone number with an audible message such as "please enter the forwarding number followed by the pound sign."

In Step 408 the SCP voices back the digits received from the user so that the user can check for errors. In the preferred embodiment, the user is instructed to input a "1" confirmation digit if the digits of the call forwarding number are correct, and a "0" confirmation digit if the digits of the call forwarding number are incorrect. If the user has input "1" for the confirmation digit (Steps 410 and Step 412), the SCP updates the call forwarding number corresponding to the calling card number and VDN in the aforementioned VDN mapping table (Step 414). If the confirmation digit entered is "0" an error in the generation, transmission or reception of the call forwarding number digits has occurred, returning the algorithm to Step 406 for another iteration.

After successful establishment or updating of the call forwarding number, the user is returned to the VDN Calling Card Service Main Menu (Steps 416 and 418) for further transactions if desired.

6. Access to VDN and Associated Voice Mailbox by Third Parties

A third party dialing a customer's VDN can either reach a call forwarding telephone number if it has been established, or the calling card customer's voice mailbox. These transactions are governed by the algorithm 500 in FIG. 5.

After the start of the algorithm (Step 502) a third party is connected to the SSP of a switch (e.g., 112) and enters the destination number. The prefix of the destination number indicates that the number is a VDN as described supra. In response the SSP sends an InitialDP signal to the SCP containing both a service key indicating a VDN has been called, and the VDN for the called party number (Step 504).

The SCP checks the VDN mapping table for a call forwarding number corresponding to the received VDN (Step 506). If there is an established call forwarding number, the SCP sends a Connect Operation signal to the SSP with a DRA containing the call forwarding number (Steps 508 and 512). This is followed by the SSP routing the call to the designated call forwarding number (Steps 516 and 518).

If no call forwarding number has been established for the VDN, the SCP sends a Connect Operation signal to the SSP with a DRA containing an NOA portion corresponding to voice mail, a destination number portion containing "3" for voice mail access, and the originalCalledPartyID portion containing the VDN (Steps 508 and 510). The SSP then routes the call to the voice mail system 108, and places the third party directly into the voice mailbox associated with the VDN (Step 514 and 518), where the third party can leave a voice mail message for the calling card customer.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A telephone calling card service system for processing telephone calls to be charged to calling card accounts, said system comprising:

a plurality of input telephonic devices operatively coupled to an origination telephone line, said input telephonic device comprising an alphanumeric information generator adapted to at least transmit a calling card account card number, security information, and a destination telephone number;

an automated intelligent network (IN) coupled to origination telephone lines adapted to process calling card account telephone calls, said IN comprising a service control point (SCP), and said SCP comprising an SCP control unit and an SCP database coupled to said SCP control unit, said IN being adapted to authorize the routing of calling card account telephone calls; and at least one switch operatively coupled to said origination telephone line and to said SCP, said switch adapted to route calls authorized by said SCP to a destination number specified by a customer;

said SCP database at least storing system account numbers, corresponding security information and an assigned Virtual Destination Number (VDN), and said SCP control unit, upon receipt of customer information collected via said origination telephone line, compares information and determines whether a telephone call is authorized; and said SCP being adapted to provide additional services to said customer and third parties based upon said VDN.

2. The system in claim 1, further comprising a calling card customer voice mailbox, and wherein said additional services comprise accessing said calling card customer voice mailbox.

3. The system in claim 2, wherein said additional services comprise creating or modifying greetings associated with said calling card customer voice mailbox.

4. The system in claim 1, wherein said additional services comprise the establishment and use of call forwarding.

5. The system in claim 1, wherein said SCP stores a mapping table at least having calling card numbers, assigned VDNs, and associated call forwarding numbers.

6. The system in claim 1, further comprising at least one calling card account subscriber voice mailbox with sufficient sub-addresses for calling card account subscribers in the system, said voice mailbox also utilizing user ID and passwords for secure access, and said voice mailbox also generating a greeting updatable by a subscriber on-line.

7. A telephone calling card service method for processing telephone calls to be charged to calling card accounts, said method comprising the steps of:

via input telephonic devices coupled to origination telephone lines, at least transmitting a calling card account card number, security information, and a destination telephone number;

via an automated intelligent network (IN) coupled to origination telephone lines, processing calling card account telephone calls, said IN comprising a service control point (SCP), and said SCP comprising an SCP control unit and an SCP database coupled to said SCP control unit, authorizing the routing of calling card account telephone calls; and via at least one switch operatively coupled to said origination telephone line and to said SCP, routing calls authorized by said SCP to a destination number specified by a customer;

said SCP database at least storing system account numbers, corresponding security information and an assigned Virtual Destination Number (VDN), and said SCP control unit, upon receipt of customer information collected via said origination telephone line, comparing information and determining whether a telephone call is authorized; and providing additional services to said customer and third parties based upon said VDN.

8. The method in claim 7, further comprising the step of providing a calling card customer voice mailbox, wherein said additional services comprise accessing said calling card customer voice mailbox.

9. The method in claim 8, wherein said additional services comprise creating or modifying greetings associated with said calling card cus tomer voice mailbox.

10. The method in claim 7, wherein said additional services comprise the establishment and use of call forwarding.

11. The method in claim 7, wherein said SCP stores a mapping table at least having calling card numbers, assigned VDNs, and associated call forwarding numbers.

12. The method in claim 7, further comprising the step of providing at least one calling card account subscriber voice mailbox with sufficient sub-addresses for calling card account subscribers in the system, said voice mailbox also utilizing user ID and passwords for secure access, and said voice mailbox also generating a greeting updatable by a subscriber on-line.

* * * * *